INVENTORS
FREDERICK V. HILDEBRANDT
CHARLES S. OCHS
GEORGE J. FOSS
BY
Norman J. Holland
ATTORNEY

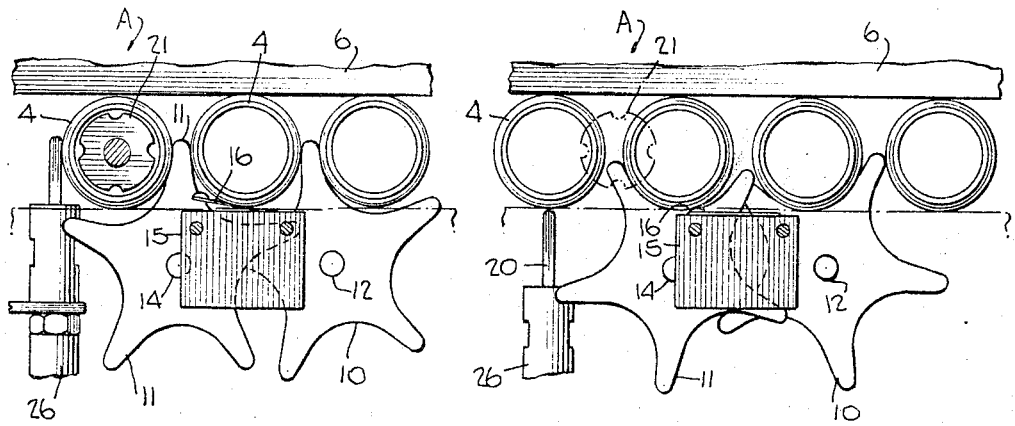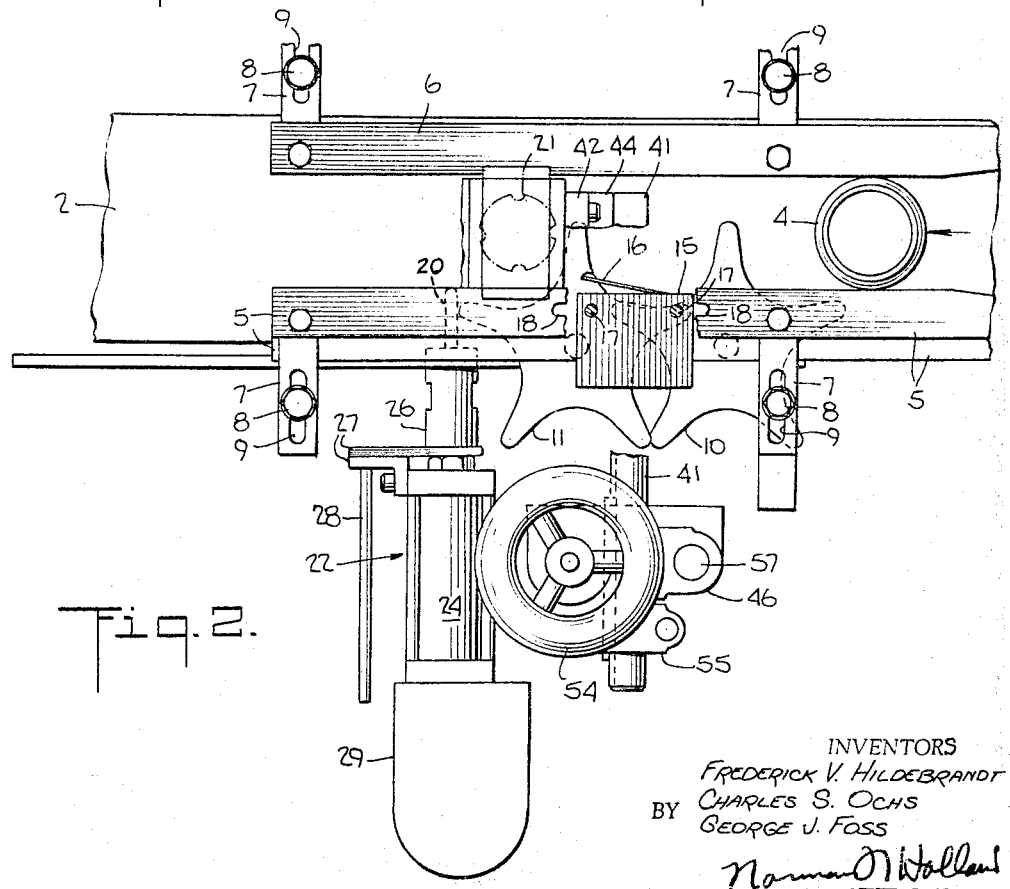

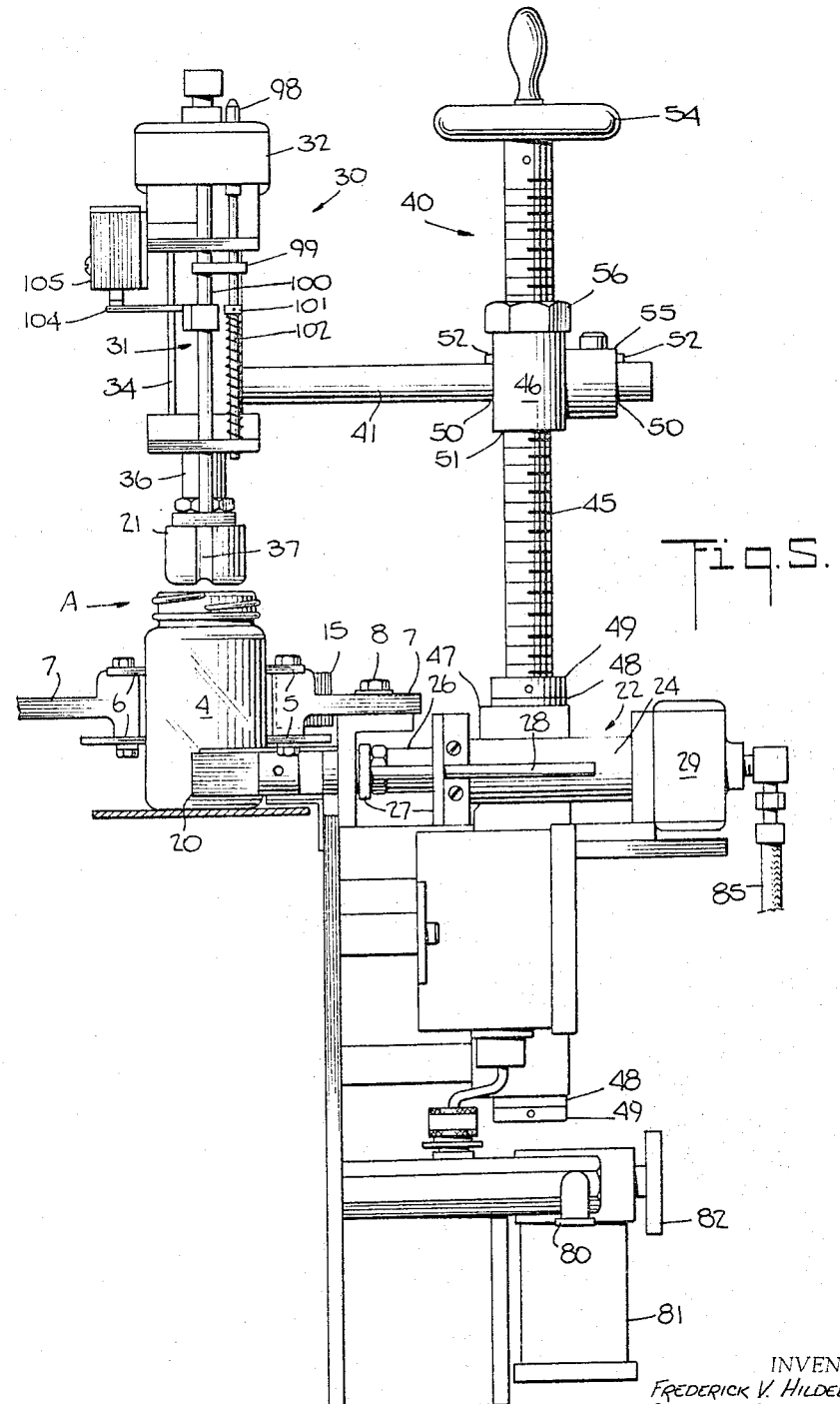

Sept. 13, 1966  F. V. HILDEBRANDT ETAL  3,272,239
HEADSPACER FOR CONTAINERS
Filed Jan. 22, 1964  5 Sheets-Sheet 4
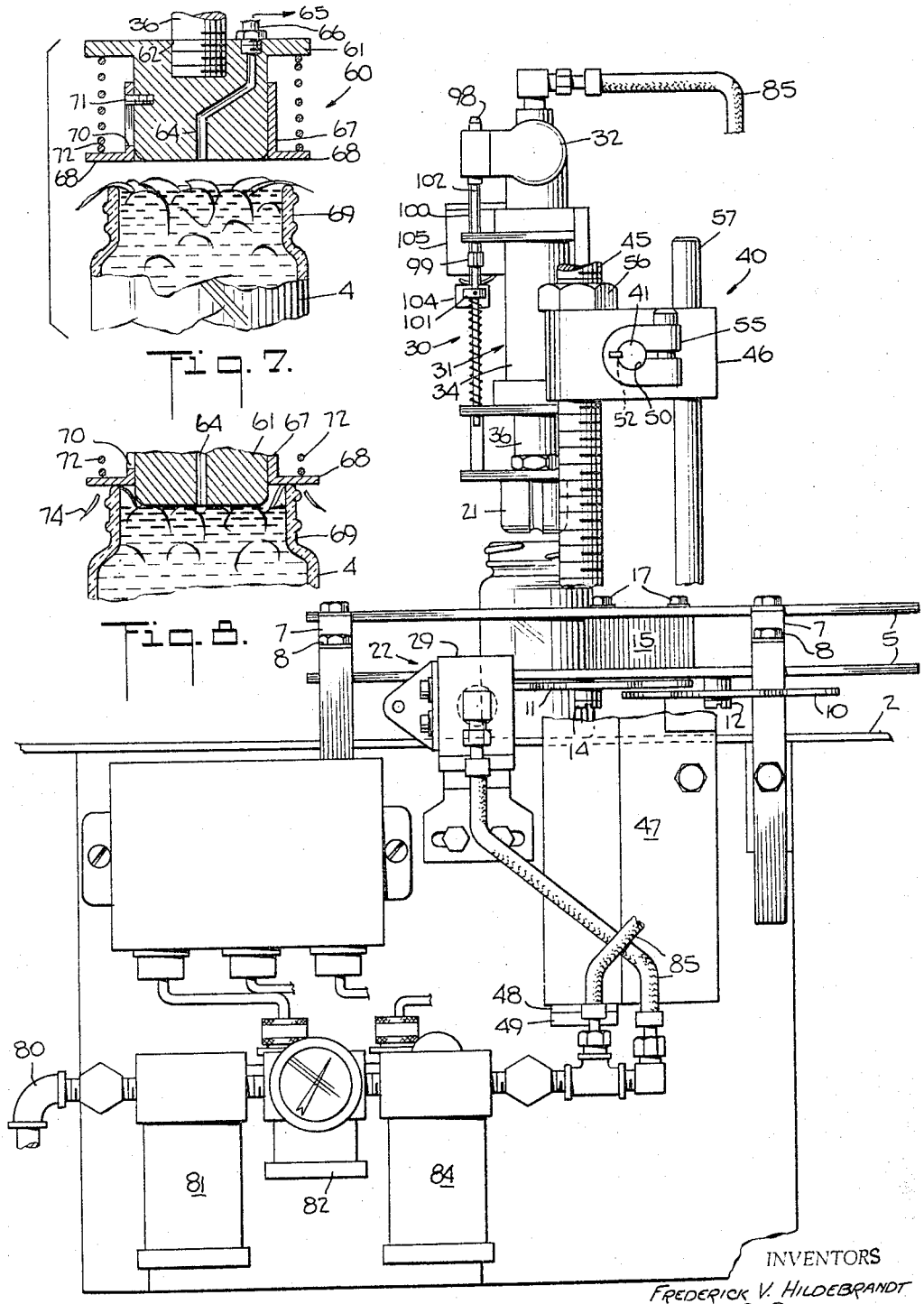

INVENTORS
FREDERICK V. HILDEBRANDT
CHARLES S. OCHS
GEORGE J. FOSS
BY
ATTORNEY

_United States Patent Office_

3,272,239
Patented Sept. 13, 1966

3,272,239
HEADSPACER FOR CONTAINERS
Frederick V. Hildebrandt, Charles S. Ochs, and George J. Foss, all of Lancaster, Ohio, assignors to Anchor Hocking Glass Corporation, Lancaster, Ohio, a corporation of Delaware
Filed Jan. 22, 1964, Ser. No. 339,847
14 Claims. (Cl. 141—168)

The present invention relates to the sealing art and more particularly to a machine for providing headspaces in containers.

In sealing containers, it is desirable to fill the containers so that the upper level of the contents is a predetermined distance below the rim of the container. The space between the contents and the sealing closure is generally called "the headspace."

If the container is not filled sufficiently, the customer is likely to feel that there is a shortage which hurts the manufacturer's reputation. If the container is too full with too little headspace, the seal may be impaired, particularly where vapor is utilized to form a vacuum within the container.

Since containers vary slightly in size, due to limitations of manufacture, and since automatic filling machines deliver the same weight or the same volume within the limits of the machine, the headspace will vary. With many products, it is desirable to deliver a little more than the required amount and to use a headspacer for removing the excess. In this way, a more uniform headspace is maintained in packages.

With products such as grated cheese, it may be necessary for the headspacer to press the contents down to a definite level. Also, where liquids and solids are combined, such as with pickles and canned fruit, the headspacer, in addition to providing a uniform level, will also press the solid objects below the surface of the liquid to better preserve them, and to prevent them from interfering with the performance of container sealing equipment which may follow the headspacer.

Some headspacers now in use utilize a series of heads mounted on a rotating disc, like chairs on a ferris wheel. The containers are synchronized in their movement so that the heads, at the bottom, will register with moving containers to displace excess contents.

In another headspacer, a series of heads are mounted at the same level and are moved by a pair of cranks in an elliptical path. In their downward position they have to register with moving containers to displace the excess contents.

Such headspacers are expensive and require helicoids or other means for synchronizing the movement of the containers with the heads of the headspacers. Different sizes of containers may require the replacement of a series of heads or other complicated changes, such as different helicoids.

The present invention provides a simple inexpensive headspacer with a single head which is effective upon containers fed with random spacing to a moving conveyor. The containers are automatically stopped on the moving conveyor, consecutively, as they register with the headspacing head. Adjustments are easy because a single head is utilized which requires neither a helicoid nor a synchronized drive. Changes and adjustments may be made without skilled mechanics and with minor loss due to shutdown time.

An object of the present invention is to provide a simple and inexpensive headspacer, particularly useful where high speeds are not required.

Another object of the present invention is to eliminate the necessity of synchronizing the movement of a series of containers with the movement of a series of headspacer heads.

Another object of the present invention is to provide a headspacer which operates with a random container feed.

Another object of the present invention is to provide a headspacer with a single head which is automatically actuated when a container is moved under it.

Another object of the present invention is to provide a headspacer which is simple to adjust and to operate.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 2 is a top plan view partially broken away of the headspacer;

FIG. 3 is a fragmentary plan view showing the operation of the star wheels during the headspacing operation;

FIG. 4 is a fragmentary plan view illustrating the operation of the star wheels as a container moves away from the headspacing station;

FIG. 5 is a side elevational view of the headspacer of the present invention;

FIG. 6 is a front elevational view, partially broken away, of the headspacer of the present invention;

FIG. 7 is a fragmentary sectional view illustrating a modified embodiment of the displacement head of the present invention as it is positioned above and in registry with a container before the headspacing operation;

FIG. 8 is a fragmentary view showing the relative positions of a container and the modified displacement head of FIG. 7 during the headspacing operation;

Figure 1:
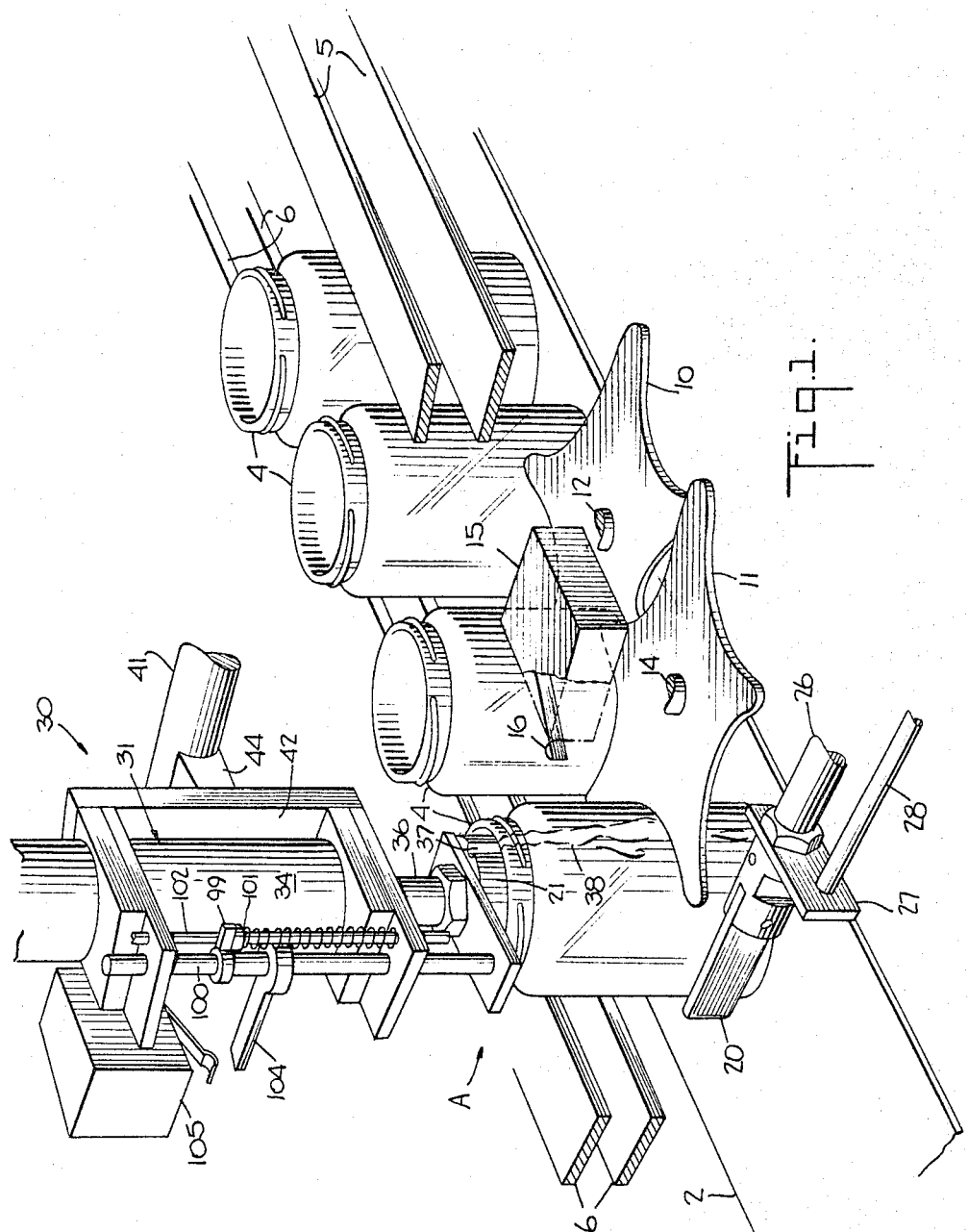
FIG. 1 is a fragmentary perspective view illustrating the operation of the headspacer of the present invention.

Referring to the drawings illustrating a preferred embodiment of the invention and more particularly to FIG. 1, a conventional conveyor 2 is preferably continuously driven and receives filled containers 4 from a filling machine or from another conveyor with random spacing. The conveyor may be the usual belt type which passes over sprockets, not shown, and is preferably a link belt construction. It is to be understood that the conveyor need not be a part of the preferred embodiment of the invention. The preferred embodiment of the invention can be moved into position near the entrance end of a conveyor on a conventional sealing machine.

Adjustable rails 5 and 6 (FIG. 1) may be used to guide the containers along the middle of conveyor 2 as they move toward the headspacing station A. Preferably, the rails comprise upper and lower flat bars adjustably mounted on each side of the conveyor. Brackets 7 (FIG. 2) interconnect the upper and lower rails, and each bracket has a slot 8 and a bolt 9 for adjusting the width of the path between the guide rails 5 and 6 located on opposite sides of the conveyor 2.

To provide an orderly procession of the containers to the headspacing station, spacing means, preferably a pair of free-wheeling star wheels 10 and 11 (FIG. 1) are provided. The star wheels 10 and 11 may be mounted for free rotation on the lower guide rail 5 by spindles 12 and 14. The star wheels overlap, and their arms pass over the conveyor 2 in between the containers 4. Since the star wheels are free-wheeling they cause the moving containers to space themselves by engaging and rotating the stars.

As shown in FIG. 3, an arm of star wheel 11 spaces the first two containers in line so that the second container does not interfere with the first container during the headspacing operation.

The star wheels guide each container 4 into contact with a switch arm 16 (FIG. 2) of a switch 15. When tripped, the switch 15 initiates the headspacing operation. The switch 15, mounted on upper guide rail 5 by bolts 17, has its arm 16 projecting into the path of the moving containers. A container 4 will depress the arm 16 as it passes through the star wheels 10 and 11 toward the headspacing station. The switch 15 may be adjusted along slots 18 to time the tripping operation for best results.

When the switch 15 is tripped to begin the headspacing operation, a container stop member 20 (FIG. 2) moves across the conveyor to stop the container at the headspacing station A underneath and in registry with a displacement head 21. The stop member 20 remains extended, stopping the container on the moving conveyor 2, during the headspacing operation, after which it is automatically retracted.

FIGURES 2, 3 and 4 show the several positions of a container 4 as it progresses through the headspacer. In FIG. 2, the container 4 is shown on the conveyor just before passing through the star wheels. In FIG. 3, the container has passed the star wheels. After the headspacing operation (FIG. 4) the container moves past the retracted stop member 20 and the next container moves into position for the headspacing operation.

Although any suitable drive member can be used to move the stop member 20 across the conveyor 2, the preferred drive, shown in FIG. 2, is an air motor 22 having a control unit 29 which responds to the tripping of switch 15 by a container 4.

The air motor 22 comprises a cylinder 24 and a piston 25 (FIG. 9) for moving the container stop member 20, which may be a straight flat bar removably fitted onto the piston rod 26 of the air motor 22 for easy replacement. A pair of brackets 27 and a guide rod 28, mounted on the cylinder 24 and the piston rod 26, prevent rotation of the stop member 20 as the piston rod 26 moves back and forth in the cylinder 24.

When the switch 15 is tripped by a container 4, the air motor 22 moves the stop member 20 across the conveyor 2 through the intermediation of a control circuit (FIGS. 9 and 10), and the air control unit 29 on the end of the air motor. Both the control circuit and the air control unit 29 for extending and retracting the container stop member 20 will be more fully described below.

Referring now to FIGURE 5, the headspacing member 30 will be described. When the stop member 20 is extended across the conveyor 2, it stops the container 4 on the conveyor underneath and in registry with the displacement head 21 located on the bottom of the headspacing member 30.

When the switch 15 is tripped, the headspacing member 30 moves the displacement head 21 down into the container 4 to create a headspace therein by overflowing the excess portion of the contents of the container. If the contents are a mixture of solids and liquid, such as canned peaches, the displacement head 21 will overflow the excess liquid and depress the peaches below the level of the liquid for better preservation. After headspacing, the displacement head 21 is automatically returned to the raised position.

Preferably, the displacement head 21 is inserted into a container by an air motor 31 on the headspacing member 30 through the intermediation of the switch 15, the control circuit (FIGS. 9 and 10) and a control unit 32 on top of the headspacer air motor 31. The control circuit and the air motor control unit will be more fully described below.

The air motor 31 comprises a cylinder 34 and a piston 35 (FIG. 9) and the displacement head 21 is removably secured to the end of a piston rod 36 on the air motor 31. It has been found preferable to thread the head 21 onto the piston rod 36, so that the head 21 may be readily changed when different size containers are to be headspaced.

The headspacing member 30 is adjustably supported over the conveyor by a super-structure designated at 40 in FIG. 5. The headspacing member 30 is mounted on a horizontal bar 41 by a frame 42 (FIG. 1) and an extension member 44. The horizontal bar 41 is supported on a vertical post 45 or lead screw by a collar 46. The vertical post is rotatably mounted upon bushings 48 in housing 47. Pinned collars 49 abut the bushings 48 to prevent axial movement of the post 45. The collar 46 has a horizontal bore 50 through which the bar 41 passes, and a vertical bore 51 which threadedly engages the vertical post 45. The horizontal bar 41 may be cylindrical and it is keyed at 52 to permit axial movement in the horizontal bore 50 without rotation.

To register the displacement head 21 with containers 4 of a given size, the headspacing member 30 is adjusted by moving the bar 41 horizontally in the collar bore 50. Vertical adjustment is obtained by turning the handwheel 54 on the top of the vertical post 45 to move the collar 46 and the headspacing member 30 up or down as desired. A clamp 55 and a nut 56 may be tightened to fix the horizontal and vertical positions respectively.

As seen in FIG. 6, a vertical guide post 57 may also extend through the collar 46 to provide added support for the headspacing member 30. In addition, the guide post 57 will prevent rotation of the headspacing member 30 about the vertical post 45 during adjustment and operation.

The displacement head 21 is suitably shaped for performing the headspacing operation. As best seen in FIGS. 1 and 5, the head is preferably cylindrical in form and has surface grooves 37, to permit overflowing the excess contents 38 of the containers. As indicated above, the head 21 may be threaded onto the piston rod 36 and may be replaced with other heads which correspond to different size containers.

A modified embodiment of the displacement head (FIGS. 7 and 8) may be used. The modified displacement head 60 depresses solid objects such as canned fruit or pickles and draws the liquid off instead of overflowing it. Some liquids, such as olive oil, are expensive and it is preferable to draw them off to a receiving tank for later use. Furthermore, drawing off the liquid instead of overflowing it promotes the cleanliness of the conveyor, the containers, and other machinery.

The modified displacement head 60 (FIG. 7) has a central body portion 61 which is threaded to the piston rod 36 at 62. A duct 64 passes through the body 61 and is connected to a vacuum source 65 through a hose 66 for drawing the liquid off. A flange 68, on a resiliently mounted sleeve 67, engages the rim 69 (FIG. 8) of the container 4 to hold it in upright position and to shear off any solids which may be protruding over the rim. In addition, the flange 68 will clear away any food particles on the rim 69, which may interfere with the capping of the container.

The sleeve 67 is mounted on the central body portion 61 by one or more slots 70 and pin 71. A spring 72 urges the sleeve 67 and its flange 68 toward its extended position.

FIGURE 8 illustrates the position of the modified head during the headspacing operation and shows solids, such as the leaves 74 from artichokes, which have been sheared off by the flange.

If desired, the modified head may overflow liquid instead of drawing it off. In this case, the duct 64 and the vacuum source 65 are dispensed with, and the liquid can be overflowed through the slots 70 and suitable recesses (not shown) between the sleeve 67 and the central body portion 61.

Referring now to FIG. 6, an air system for supplying compressed air to the air motors for the displacement head 21 and for the container stop member 20 is illustrated.

Air passes through line 80 to a filter 81 which removes moisture and dirt from the air. From the filter, the air passes through a pressure regulator 82 to a lubricator 84. The lubricator adds oil droplets to the air in order to lubricate the moving parts of the air motors 22 and 31. The air then flows through lines 85 to the air motors 31 and 22 for the displacement head 21 and for the stop member 20, respectively, during the headspacing operation.

It has been found preferable to use an electrical control circuit (FIGS. 9 and 10) to initiate and coordinate the movements of the various components for the headspacing operation. The operation of the headspacer will be apparent as the control circuit is described.

Figure 9:
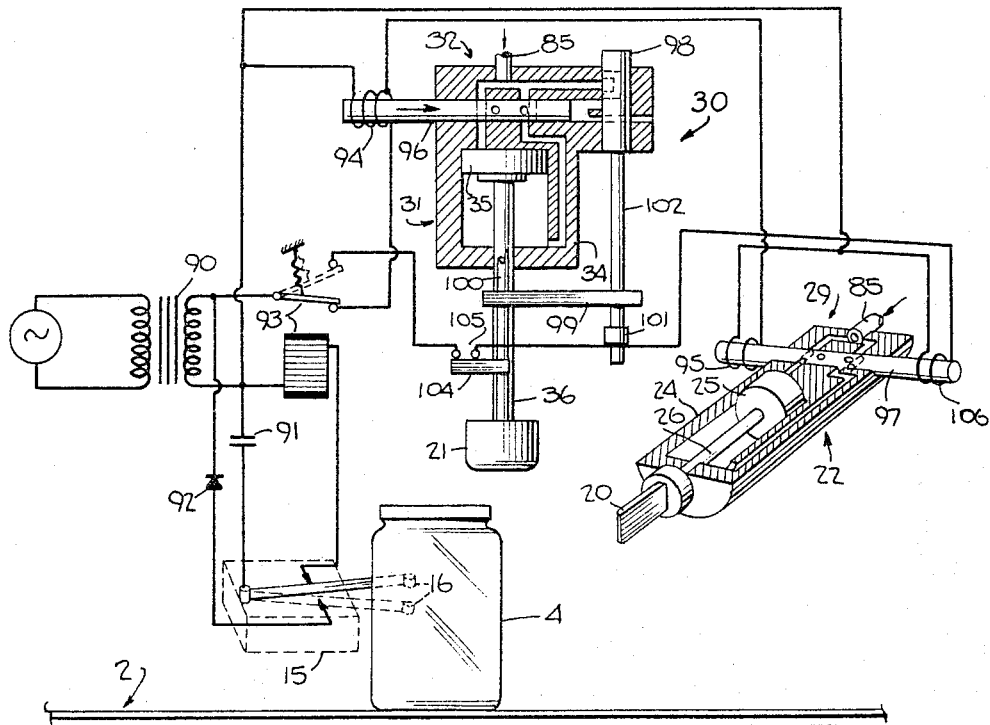
FIG. 9 is a schematic diagram of the control circuit before the headspacing operation.

As shown in FIG. 9, a container 4 trips switch 15 as the container moves toward the headspacing station. Switch 15, when actuated, initiates the headspacing cycle by starting the displacement head 21 on its downward movement and by moving the container stop member 20 across the conveyor 2 to stop the moving container in registry with the displacement head 21. The displacement head is inserted into the container 4 to perform the headspacing operation.

The electric circuit for controlling the displacement head 21 and the stop member 20 is illustrated in FIG. 9. While the switch arm 16 is in its normal position, as illustrated by the dash lines in FIG. 9, the output voltage from a step-down transformer 90 charges a capacitor 91 through a rectifier 92 and the switch 15. When the container trips the switch arm 16, the capacitor 91 discharges through and actuates a relay 93. The relay 93, which is actuated momentarily by the capacitor discharge, couples the output of the transformer 90 to both a solenoid 94 in the control unit 32 for the headspacing air motor 31 and another solenoid 95 in the control unit 29 for the container stop air motor 22.

The energized solenoid 94 on the headspacing air motor shifts an air inlet valve 96 to the right (FIG. 9) to admit air to the top of the piston 35 of the air motor 31 causing the displacement head 21 to begin downward movement.

Similarly, the energized solenoid 95 on the container stop air motor shifts an air inlet valve 97 to the right (FIG. 9) to admit air to the upper side of the piston 25 and the stop member 20 moves across the conveyor 2 into the container path. The stop member 20 engages and stops the container 4 on the conveyor 2 underneath and in registry with the displacement head 21. The displacement head, then moves into the container and provides a suitable headspace.

It is to be understood that, as compressed air is admitted to one side of the pistons of air motors 22 and 31, the air on the other side of the pistons is exhausted through suitable exhaust ports in air valves 95 and 96 respectively.

Although the movements of the displacement head 21 and the stop arm 20 are initiated simultaneously, the piston 25 of the container stop air motor 22 is adjusted to move faster than that of the displacement head air motor 31. In this way, the container 4 is first stopped at the stop member 20 in registry with the descending head. The relative speeds of movement of the stop member 20 and the head 21 are adjustable by having suitable controls on the cylinder exhaust ports.

After the headspacing operation, the displacement head 21 and the stop member 20 are automatically returned to their initial positions for the next cycle. First, the displacement head 21 returns to its raised position, and then the stop member 20 moves back to its retracted position.

Figure 10:
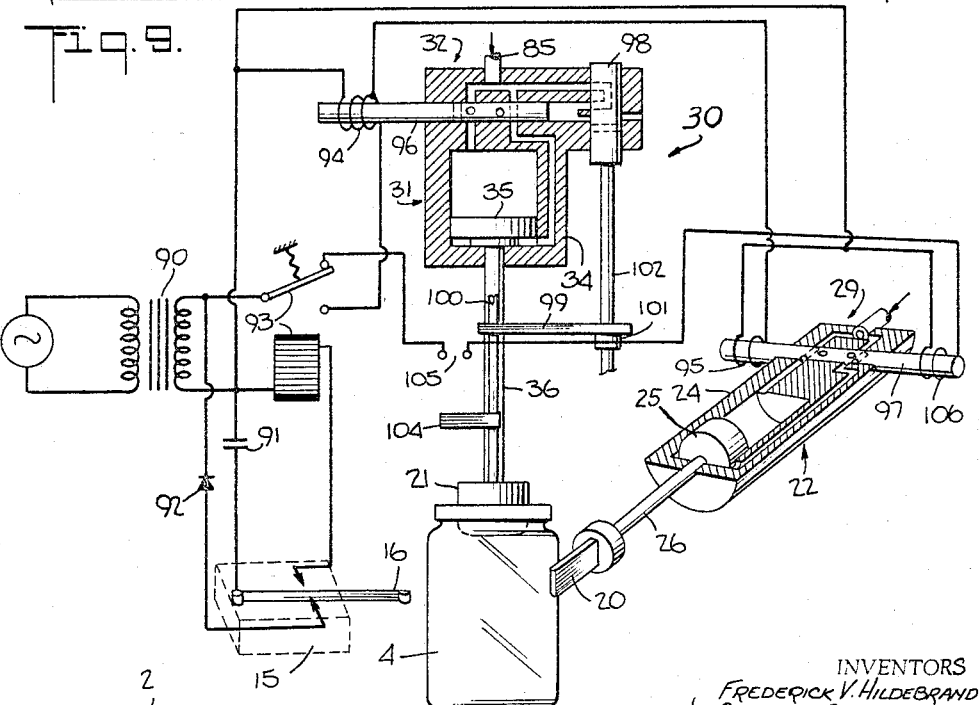
FIG. 10 is a schematic diagram corresponding to FIG. 9 showing the position of the various components of the present invention during the headspacing operation.

FIGURE 10 illustrates the various components as they are positioned just before returning to their initial positions.

When the displacement head 21 on the air motor 31 is in its lowermost position, a pilot valve 98 shifts the air inlet valve 96 to admit air to the bottom of the headspacing air motor 31 as follows. The pilot valve 98 is momentarily depressed when an arm 99 on a vertical rod 100 engages a collar 101 to lower the pilot valve rod 102. Compressed air flows through the pilot valve 98 and shifts the air inlet valve 96 to its left position admitting air to the bottom of the headspacer air motor 31. The displacement head 21 now returns to its raised position. The displacement head remains in the upper position until the next successive container 4 trips the switch 15 to start another cycle.

When the displacement head reaches its raised position, an arm 104 on the vertical rod 100 closes a switch 105 on the headspacing member 30. Closing the switch 105 completes the circuit from the output of the transformer 90 through relay 93 to a second solenoid 106 on the container stop air motor 22. The energized solenoid 106 shifts the air inlet valve 97 to the left and compressed air causes the air motor 22 to retract the container stop member 20.

The headspacing operation is now complete and the cycle is again repeated for succeeding containers.

It will be understood that the switch 15 is tripped only momentarily during the movement of a container 4 to the headspacing station and that the switch 15 is in its normal or open position while the container is stopped at the head spacing station (FIG. 3). This arrangement provides for the recharging of the capacitor 91 in preparation for the next headspacing cycle. Similarly, the relay 93 is energized only long enough to move the air inlet valves 96 and 97 to their piston extending positions.

It will be seen that the present invention provides a simple inexpensive machine for creating headspace in overfilled random fed containers. The headspacing operation is initiated only when a container passes along the conveyor toward the headspacing station. The control circuit, which initiates the headspacing cycle, eliminates the need for costly synchronization equipment which heretofore has been used to register the moving container with the moving displacement head. Elimination of synchronization equipment makes for easy adjustment of the headspacer to accommodate different size containers. The cooperation between the container stop member, the displacement head, and the star wheels which space subsequent containers provides for effective headspacing of each container with little or no danger of toppling the container. A modified displacement head has been provided which both aids each container in maintaining an upright position and draws liquid off to reduce waste.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. A machine for providing headspaces in overfilled containers comprising the combination of a conveyor for moving randomly spaced containers to a head-spacing station, a sensor positioned adjacent to the path of said moving containers, means for guiding said containers past the said sensor whereby each container operates the sensor, a container stop, first drive means responsive to said sensor for moving said container stop for stopping a container at said headspacing station, a headspacing member, second drive means responsive to the actuation of said sensor for inserting said headspacing member into a container for providing an adequate headspace therein, means activated by said headspacing member for actuating said second drive means for withdrawing the headspacing member from the container and to initiate the removal of said stop from engagement with the container by said first drive means.

2. The machine as claimed in claim 1 in which said last said means for actuating said second drive means comprises a valve.

3. The machine as claimed in claim 1 in which said headspacing member comprises means for withdrawing fluid from the containers.

4. The machine as claimed in claim 1 in which said headspacing means comprises shearing means for clearing the rims of said containers.

5. The machine as claimed in claim 1 which further comprises means for spacing a container held at said stop from the following container on the conveyor.

6. A machine for displacing a portion of the product in over-filled containers to provide a suitable headspace therein comprising the combination of a conveyor to move containers delivered to it, means for spacing the containers on the conveyor, a stop adapted to be moved into and out of the path of the containers to stop a container on the conveyor, first drive means for moving said stop, a headspacer, second drive means for moving the headspacer into and out of a container to provide a suitable headspace therein, sensing means responsive to a moving container to activate both the first drive means for moving said stop into the path of the containers and the second drive means for moving said headspacer into a container, means cooperating with the second drive means for moving the headspacer out of a container, and second sensing means activated by said headspacer for initiating movement of the stop out of the path of the containers by said first drive means.

7. The machine as claimed in claim 6 in which said means cooperating with the second drive means for moving the headspacer out of a container comprises a valve.

8. The machine as claimed in claim 6 in which said headspacer comprises means for drawing excess fluid from the containers.

9. The machine as claimed in claim 6 in which said headspacer comprises shearing means for clearing the rims of the containers.

10. The machine as claimed in claim 6 which further comprises means for spacing a container held by said stop from the following container on the conveyor.

11. In a headspacer for displacing a portion of the contents of over-filled containers on a moving conveyor, the combination of a first switch actuated by a container on the moving conveyor, a relay responsive to the actuation of said switch, a device for stopping the container on the moving conveyor, a first solenoid actuated air motor responsive to the closing of said relay for moving said device into the path of said container, a member adapted to enter said containers to provide a headspace therein, a second solenoid controlled air motor responsive to the closing of said relay for moving said member into a container, means cooperating with said second air motor for moving said member out of the container, a second switch adapted to close when the member has been moved out of a container, said second switch further adapted upon closing to actuate said first air motor to withdraw the device from the path of the container.

12. The machine as claimed in claim 11 in which said headspacer member comprises means for drawing excess fluid from the containers.

13. The machine as claimed in claim 11 in which said headspacer member comprises shearing means for clearing the rims of the containers.

14. The machine as claimed in claim 11 which further comprises means for spacing a container held by said stop from the following container on the conveyor.

References Cited by the Examiner

UNITED STATES PATENTS

| | | | |
|---|---|---|---|
| 1,397,184 | 11/1921 | Schaub | 141—180 |
| 1,884,666 | 10/1932 | Guenther | 141—80 |
| 1,963,132 | 6/1934 | Hicks | 141—123 |
| 2,347,974 | 5/1944 | Smith | 141—180 X |
| 2,444,502 | 7/1948 | Fromer | 141—80 |
| 2,749,005 | 6/1956 | Plusquellic | 141—180 |

LAVERNE D. GEIGER, *Primary Examiner.*

H. BELL, *Assistant Examiner.*